United States Patent [19]

Müller

[11] 4,207,910

[45] Jun. 17, 1980

[54] METHOD AND APPARATUS FOR BUILDING UP AND REDUCING THE PRESSURE OF GASES IN IONOGRAPHY IMAGING CHAMBERS

[75] Inventor: Jügen Müller, Münich, Fed. Rep. of Germany

[73] Assignee: Agfa-Gevaert Aktiengesellschaft, Leverkusen, Fed. Rep. of Germany

[21] Appl. No.: 928,061

[22] Filed: Jul. 26, 1978

[30] Foreign Application Priority Data

Jul. 29, 1977 [DE] Fed. Rep. of Germany ....... 2734323

[51] Int. Cl.[2] ............ G03B 41/16

[52] U.S. Cl. ............ 137/14; 137/568; 137/571; 250/315.1

[58] Field of Search ............ 137/14, 224, 565, 568, 137/571, 572; 251/172; 250/315 A

[56] References Cited

U.S. PATENT DOCUMENTS

| | | | |
|---|---|---|---|
| 3,780,761 | 12/1973 | Whitson et al. | 137/572 X |
| 3,797,516 | 3/1974 | Forster et al. | 137/568 X |
| 3,828,191 | 9/1974 | Eseke et al. | 250/315 A |
| 3,836,777 | 9/1974 | Lewis et al. | 250/315 A |
| 4,074,133 | 2/1978 | Muller et al. | 250/315 A |

*Primary Examiner*—William R. Cline

*Attorney, Agent, or Firm*—Peter K. Kontler

[57] ABSTRACT

The interelectrode gap of an ionography imaging chamber is connected with a variable-volume container which is filled with a high Z gas at atmospheric pressure, and with first and second accumulators which respectively contain high Z gas at a higher and lower superatmospheric pressure. A timer circuit actuates valves in the conduits between the chamber on the one hand and the container and accumulators on the other hand in a given sequence so that, when the pressure of high Z gas in the gap is to be raised to an operating pressure which exceeds the aforementioned higher pressure, the circuit opens a first valve which allows gas to flow from the second accumulator into the chamber and thereafter a second valve which allows gas to flow from the first accumulator into the chamber. The circuit thereupon starts a pump which conveys gas from the container into the chamber whereby the volume of the container decreases. The pumping step is terminated when the pressure in the gap reaches the operating pressure. When the pressure in the gap is to be reduced, the second valve is opened prior to the first valve, and the circuit thereupon opens a third valve which connects the gap with the container so that the container expands until the pressure in the gap drops to atmospheric pressure.

13 Claims, 1 Drawing Figure

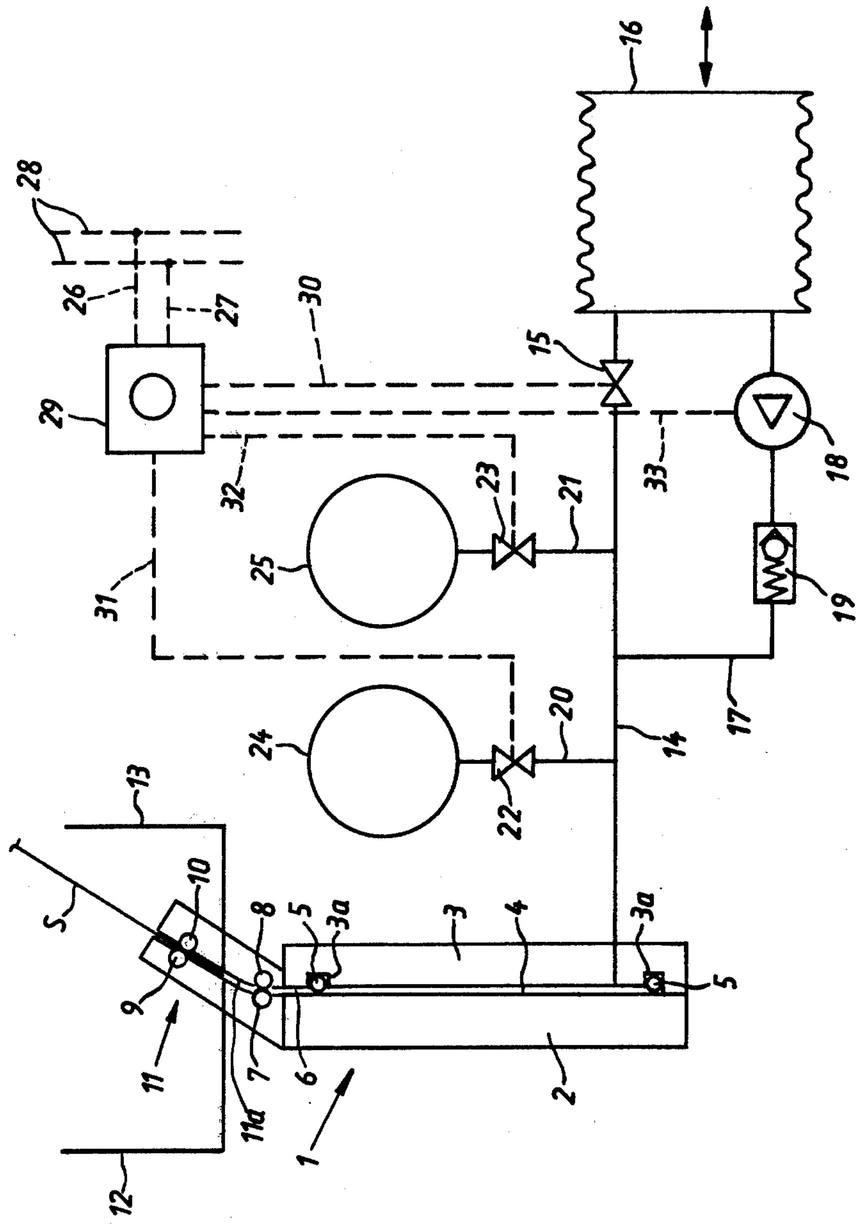
1
2
3
3a
3a
4
5
5
6
7
8
9
10
11
11a
12
13
14
15
16
17
18
19
20
21
22
23
24
25
26
27
28
29
30
31
32
33
S

METHOD AND APPARATUS FOR BUILDING UP AND REDUCING THE PRESSURE OF GASES IN IONOGRAPHY IMAGING CHAMBERS

BACKGROUND OF THE INVENTION

The invention relates to a method and apparatus for regulating the admission of fluids into the interior of and the evacuation of fluids from chambers wherein the fluids are maintained at an elevated pressure. More particularly, the invention relates to improvements in a method and apparatus for building up and reducing the pressure of a gaseous fluid in a chamber wherein a dielectric receptor sheet is exposed to object-modulated X-rays while the pressure of fluid in the chamber exceeds atmospheric pressure.

Commonly owned copending application Ser. No. 829,960 filed Sept. 1, 1977 by Jürgen Müller et al. for "Ionography imaging method and chamber" discloses a system which admits a high Z gas into the interelectrode gap of an ionography imaging chamber upon introduction of a dielectric receptor sheet into the gap and evacuates the gas prior to removal of the dielectric receptor sheet from the gap. The system employs a container which constitutes or includes a bellows and is connected with the interelectrode gap of the ionography imaging chamber upon completion of the exposure of a dielectric receptor sheet to object-modulated radiation. The highly compressed gas flows from the gap into the container whereby the latter expands and the pressure of the gas decreases. When the pressure in the gap is reduced to atmospheric pressure, the chamber is opened to allow for withdrawal of a receptor sheet which bears a latent image of the X-rayed object. The gap then receives a fresh receptor sheet and a pump is started to return the gas from the container into the interelectrode gap. Such circulation of the gas along a path which is practically completely sealed from the atmosphere is desirable and necessary in order to avoid losses of expensive gas, e.g., Xenon, Krypton or Freon. A drawback of the just described system is that the evacuation of gas from the interelectrode gap and the reintroduction of gas into the gap takes up a substantial amount of time. Moreover, the system must employ a relatively large expandible container, especially if the pressure of gas during exposure of a dielectric receptor sheet to object-modulated radiation is rather high. Such pressure can be as high as 20 atmospheres.

OBJECTS AND SUMMARY OF THE INVENTION

An object of the invention is to provide a novel and improved method of rapidly increasing the pressure of a gaseous fluid in the interelectrode gap of an ionography imaging chamber to operating pressure.

Another object of the invention is to provide an economical method wherein the energy requirements of equipment for raising the pressure of gas in the interelectrode gap to operating pressure are a small fraction of energy requirements of heretofore known compressing systems.

A further object of the invention is to provide a method which can be practiced without losses in gas which is used to fill the interelectrode gap of an ionography imaging chamber during exposure of a dielectric receptor sheet to object-modulated radiation.

An additional object of the invention is to provide a novel and improved multi-stage method of admitting high Z gas into and of evacuating high Z gas from the interelectrode gap of an ionography imaging chamber.

Another object of the invention is to provide a novel and improved apparatus for the practice of the above outlined method.

A further object of the invention is to provide an apparatus which can be used for the practice of the above outlined method in conjunction with heretofore known ionography imaging chambers.

An addition object of the invention is to provide the apparatus with novel and improved means for admitting gas into and for evacuating gas from an interelectrode gap in two or more stages.

One feature of the invention resides in the provision of a method of admitting a gaseous fluid into the interior of a chamber, particularly of admitting a high Z gas into the interelectrode gap of an ionography imaging chamber. The method comprises the steps of confining a first supply of gaseous fluid in a variable-volume first container at a relatively low first pressure (e.g., at atmospheric pressure), confining a second supply of gaseous fluid in a second container (e.g., an accumulator) at a relatively high second pressure, establishing a path for the flow of fluid from the second container into the chamber so that the pressure of fluid in the chamber rises while the pressure of fluid in the second container drops below the second pressure until the pressure in the chamber matches the reduced pressure in the second container, sealing the second container from the chamber, pumping the fluid from the first container into the chamber so that the pressure in the chamber rises above the second pressure, and reducing the volume of the first container in the course of the pumping step so that the pressure in the first container continues to match or at least approximates the first pressure (the volume reducing step can take place automatically in response to the pressure of atmospheric air upon the exterior of the first container).

The method further comprises the steps of establishing a path for the flow of fluid from the chamber into the second container (while the pressure of fluid in the chamber exceeds the second pressure) so that the pressure in the chamber drops and the pressure of fluid in the second container rises back to the second pressure, sealing the second container from the chamber, connecting the chamber with the first container, and simultaneously increasing the volume of the first container so that the pressure of fluid in the first container continues to match or at least approximates the first pressure whereby the pressure of fluid in the chamber decreases to such first pressure.

If desired or necessary, the method may further comprise the steps of confining a third supply of gaseous fluid in a third container (e.g., an accumulator) at a third pressure which exceeds the first but is less than the second pressure, establishing a path for the flow of fluid from the third container into the chamber (while the pressure in the chamber matches the first pressure) prior to connection of the second container with the chamber so that the pressure of fluid in the chamber rises while the pressure in the third container drops below the third pressure until the pressure in the chamber matches the reduced pressure in the third container, and sealing the third container from the chamber prior to establishment of a path for the flow of fluid from the second container into the chamber.

When the chamber receives fluid from second and third containers prior to pumping of fluid from the first container, the pressure of fluid in the chamber is reduced in the following way: The method then comprises the additional steps of establishing a path for the flow of fluid from the chamber (wherein the pressure exceeds the second pressure) to the second container so that the pressure in the chamber drops to the second pressure and the pressure in the second container rises back to the second pressure, sealing the second container from the chamber, connecting the chamber with the third container so that the pressure in the chamber drops again and the pressure in the third container rises back to the third pressure, sealing the third container from the chamber, connecting the chamber with the first container, and simultaneously increasing the volume of the first container so that the pressure in the first container continues to match or at least approximates the first pressure whereby the pressure in the chamber decreases to such first pressure.

The volume of the second container preferably at least equals the volume of the chamber.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a diagrammatic view of an apparatus which embodies one form of the invention and wherein high Z gas is stored in an expandible container and in two accumulators when the pressure of high Z gas in the gap of the ionography imaging chamber is reduced to atmospheric pressure.

DESCRIPTION OF THE PREFERRED EMBODIMENTS

The apparatus which is shown in the drawing comprises an ionography imaging chamber 1 having sections 2 and 3 which define an interelectrode gap 4. Reference may be had to commonly owned U.S. Pat. No. 4,021,668 granted May 3, 1977 to Josef Pfeifer et al. for "Ionography imaging chamber." The disclosure of this patent is incorporated herein by reference. An inflatable or otherwise deformable seal 5 is installed between the sections 2 and 3 so that it surrounds the interelectrode gap 4 and seals the latter from the surrounding atmosphere when the gap receives a dielectric receptor sheet S and the gap 4 is about to be filled with a high Z gas, e.g., Xenon, Krypton or Freon. The section 3 has a marginal surface facing the adjacent marginal surface of the section 2 and formed with a circumferential groove 3*a* for the seal 5. A seal which can be used in the ionography imaging chamber 1 is disclosed, for example, in commonly owned copending application Ser. No. 768,539 filed Feb. 14, 1977 by Kurt Thate et al. for "Sealing device" now U.S. Pat. No. 4,135,698. Reference may be had to the just mentioned copending application for the details of construction, mounting and operation of the seal 5.

When the pressure of high Z gas in the gap 4 is reduced, the exposed dielectric receptor sheet S can be withdrawn by way of a channel member or gate 11 which defines a slot 11*a* communicating with the gap 4 when the sealing action of the member 5 is terminated. The channel 11 contains two pairs of advancing rolls 7, 8 and 9, 10 which are driven by reversible prime mover means (not shown) so that an exposed sheet S can be withdrawn from the gap 4 or a fresh sheet can be introduced into the gap. The trailing end of the sheet S (when the latter is fully inserted into the gap 4) preferably extends into the nip of the advancing rolls 7, 8 so that it can be moved through the slot 11*a* and on toward the nip of the rolls 9, 10 as soon as the prime mover means is started in the appropriate direction. The slot 11*a* communicates with a slot 6 between the sections 2, 3 at the outside of the seal 5. The slot 6 communicates with the gap 4 when the seal 5 is not inflated or otherwise deformed to establish a fluidtight seal around the gap 4.

The slot 11*a* communicates with conduits 12 and 13 which can admit into the channel member 11 a neutral buffer gas (e.g., CO2 gas) to prevent escape of expensive high Z gas from the gap 4 when the sealing action of the member 5 is interrupted and a sheet S is moved into or from the interior of the chamber 1. The details of the channel member 11 and of the means for introducing a buffer gas into the slot 11*a* for the aforementioned purpose are disclosed in commonly owned U.S. Pat. No. 4,074,133 granted Feb. 14, 1978 to Jürgen Müller et al. for "Ionography imaging chamber." The disclosure of this patent is incorporated herein by reference.

The means for admitting high Z gas into and for evacuating such gas from the interelectrode gap 4 comprises a conduit 14 which is in permanent communication with the gap 4 and can communicate with a bellows-shaped expandible (first) container 16 in response to opening of a solenoid-operated valve 15. The container 16 is readily deformable, i.e., it will expand as long as the pressure in its interior is at least slightly below the pressure in the conduit 14 and gap 4. In other words, the container 16 will expand until the pressure of high Z gas therein equals or very closely approximates the pressure of the surrounding atmospheric air.

A bypass conduit 17 connects the container 16 with the conduit 14 in the region between the gap 4 and the valve 15. The conduit 17 contains a pump 18 and a one-way ball check valve 19 which enables the pump 18 to convey gas from the container 16 into the gap 4 but prevents the flow of gas through the conduit 17 in the opposite direction.

The conduit 14 is further connected with two containers or accumulators 24 and 25 by conduits 20 and 21, respectively. These conduits communicate with the conduit 14 between the gap 4 and the valve 15. Normally, the accumulators 24 and 25 are respectively sealed from the conduit 14 by solenoid-operated valves 22 and 23. The outer casings of the accumulators 24, 25 are not deformable.

The apparatus further comprises a timer circuit 29 which is connected to an energy source (leads 28) by conductor means 26, 27 and is further connected with the valves 15, 22, 23 by conductor means 30, 31, 32. Additional conductor means 33 connects the timer circuit 29 with the motor for the pump 18.

The operation is as follows:

When the gap 4 contains a fresh dielectric receptor sheet S, the seal 5 prevents leakage of high Z gas from the chamber 1 and the operating pressure of high Z gas is normally in the range of several atmospheres. The valves 15, 22 and 23 are closed and the pump 18 is idle.

When the exposure of the sheet S in the gap 4 to object-modulated X-rays is completed, the timer circuit 29 transmits a signal via conductor means 31 to energize or deenergize the solenoid of the valve 22 so that the accumulator 24 communicates with the conduit 14 and hence with the gap 4. The flow of high Z gas from the gap 4 into the accumulator 24 is terminated when the pressure in the accumulator 24 equals the (reduced) pressure of high Z gas in the interior of the chamber 1. The member 5 continues to seal the gap 4 from the atmosphere as well as from the slots 6 and 11*a*. The timer circuit 29 thereupon closes the valve 22 and opens the valve 23 to allow high Z gas to flow from the gap 4 into the accumulator 25. The flow of gas into the accumulator 25 is terminated when the pressure therein matches the (twice reduced) pressure of high Z gas in the gap 4. The valve 23 is thereupon closed and the valve 15 is opened so that the gas can flow from the gap 4 into the container 16 which expands until the pressure of high Z gas in the gap 4 equals or closely approximates atmospheric pressure. The valve 15 opens when the pressure of gas in the gap 4 is already low, i.e., the container 16 accepts only such quantities of high Z gas which are needed to reduce the pressure of the gas in the chamber 1 to atmospheric pressure or very close to atmospheric pressure.

The timer circuit 29 thereupon closes the valve 15 (even though such closing is not absolutely necessary before the seal 5 is deflated or otherwise disengaged from the sheet S in the gap 4) so that the sheet can be withdrawn via slots 6 and 11*a* in response to starting of prime mover means for the advancing rolls 7–10. The direction of rotation of the rolls 7–10 is thereupon reversed so that they introduce a fresh sheet S into the chamber 1 before the member 5 is expanded or otherwise deformed to seal the gap 4 from the atmosphere and from the slot 6.

The pressure in the gap 4 is thereupon raised in the following way: The timer circuit 29 opens the valve 23 while the valves 22 and 23 are closed and the pump 18 is idle. The accumulator 25 then admits gas into the gap 4 via conduits 21 and 14. The valve 23 is closed after elapse of an interval which suffices to insure that the pressure in the gap 4 equals the (reduced) pressure in the accumulator 25. The circuit 29 then opens the valve 22 (such opening can take place simultaneoulsy with closing of the valve 23) whereby the pressure in the gap 4 rises because the pressure in the accumulator 24 exceeds the pressure of gas in the gap 4 after closing of the valve 23. The valve 15 remains closed and the pump 18 remains idle. The valve 22 is closed after an interval which suffices to insure that the pressure in the gap 4 matches the (reduced) pressure in the accumulator 24. It is clear that the conduits 14, 17, 20 and 21 can be connected with suitable pressure gauges and that the accumulators 24, 25 can also be equipped with pressure gauges so as to enable an attendant to monitor the rise and fall of pressure in the gap 4 and in the accumulators 24, 25. When the valve 22 is closed, the pressure in the gap 4 greatly exceeds atmospheric pressure but is still below the operating pressure. Such operating pressure is achieved by starting the motor for the pump 18 via conductor means 33 while the valves 15, 22 and 23 are closed. The pump 18 then transfers high Z gas from the container 16 (whose volume decreases accordingly) into the gap 4 via conduit 17, one-way valve 19 and conduit 14. The motor for the pump 18 can be arrested automatically after elapse of an interval which is needed to convey a predetermined quantity of high Z gas from the container 16 into the gap 4.

The manner in which the admission of buffer gas via conduits 12, 13 and the inflation and deflation of the seal 5 is regulated is preferably the same as or similar to that disclosed in the aforementioned copending application Ser. No. 829,960 of Jürgen Müller et al. If desired, the timer circuit 29 can be designed to control the admission and evacuation of buffer gas as well as the inflation and deflation of the seal 5 in synchronism with operation of other controlled components (15, 18, 22 and 23) of the apparatus.

The improved apparatus is susceptible of many modifications without departing from the spirit of the invention. For example, the number of accumulators can be reduced to one or increased to three or more. The provision of a relatively large number of accumulators exhibits the advantage that the quantity of gas which must be pumped from the container 16 into the gap 4 is reduced. If the apparatus which is shown in the drawing comprises a third accumulator wherein the maximum pressure of gas is lower than the maximum pressure of gas in the accumulator 25, the third accumulator will be connected with the conduit 14 after the filling of accumulators 24, 25 is completed and the third accumulator will accept a certain percentage of gas which, in the absence of such third accumulator, would have to enter the container 16. When the gap 4 is to be refilled with gas at an elevated pressure, the third accumulator is connected with the conduit 14 prior to connection of this conduit with the accumulators 25 and 24.

If the apparatus employs a single accumulator and the volume of such accumulator greatly exceeds the volume of the gap 4, the pressure between the gap 4 and such single container is equalized when the latter accepts approximately (normally a little less than) 50 percent of the total volume of confined gas. If the volume of the gap 4 equals the volume of a single accumulator, the latter can accept approximately 34 percent of the total quantity of confined high Z gas.

The accumulator or accumulators of the improved apparatus may be any known vessels (known as receivers, storage cylinders, gas bottles or gas cylinders) which can store a gaseous fluid at an elevated pressure. At least one accumulator (i.e., the accumulator 24) should be capable of withstanding the full operating pressure of gas, namely, that pressure which prevails in the gap 4 when a sheet S in the gap is exposed to object-modulated radiation. The pressure of gas in the accumulator 24 is always higher than the maximum pressure of gas in the accumulator 25, and the pressure of gas in the accumulator 25 is always higher than the pressure in the container 16 (i.e., the pressure in the accumulator 25 exceeds atmospheric pressure also) when the pressure therein drops in response to opening of the valve 23 at a time when the pressure in the gap 4 equals the pressure in the container 16. Only one of the valves 15, 20, 21 is preferably open at any time.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. A method of admitting a gaseous fluid into the interior of a chamber, particularly of admitting a high Z gas into the interelectrode gap of an ionography imaging chamber, comprising the steps of confining a first supply of gaseous fluid in a variable-volume first container at a relatively low first pressure; confining a second supply of gaseous fluid in a second container at a relatively high second pressure; establishing a path for the flow of fluid from the second container into the chamber so that the pressure in the chamber rises while the pressure in the second container decreases until the pressure in the chamber matches the reduced pressure in the second container; sealing the second container from the chamber; pumping the fluid from the first container into the chamber so that the pressure in the chamber rises above said second pressure; and reducing the volume of the first container in the course of said pumping step so that the pressure in the first container continues to match or at least approximates said first pressure.

2. A method as defined in claim 1, further comprising the steps of establishing a path of the flow of fluid from the chamber into the second container while the pressure in the chamber exceeds said second pressure so that the pressure in the chamber decreases and the pressure in the second container rises to said second pressure, sealing the second container from the chamber, connecting the chamber with the first container and increasing the volume of the first container so that the pressure therein continues to match or at least approximates said first pressure whereby the pressure in the chamber decreases to said first pressure.

3. A method as defined in claim 1, further comprising the steps of confining a third supply of fluid in a third container at a third pressure which is higher than said first but lower than said second pressure, establishing a path for the flow of fluid from the third container into the chamber prior to establishment of said first mentioned path so that the pressure in the chamber rises while the pressure in the third container decreases until the pressure in the chamber matches the reduced pressure in the third container, and sealing the third container from the chamber prior to establishment of said first mentioned path.

4. A method as defined in claim 3, further comprising the steps of connecting the chamber with the second container while the pressure in the chamber exceeds said second pressure so that the pressure in the chamber decreases and the pressure in the second container rises to said second pressure, sealing the second container from the chamber, connecting the chamber with the third container so that the pressure in the chamber decreases again and the pressure in the third container rises back to said third pressure, sealing the chamber from the third container, connecting the chamber with the first container and simultaneously increasing the volume of the first container so that the pressure in the first container continues to match or at least approximates said first pressure whereby the pressure in the chamber decreases to such first pressure.

5. A method as defined in claim 1, wherein said first pressure at least approximates atmospheric pressure.

6. A method as defined in claim 1, wherein the volume of the second container at least equals the volume of the chamber.

7. Apparatus for admitting a gaseous fluid into the interior of a chamber, particularly for admitting a high Z gas into the interelectrode gap of an ionography imaging chamber, comprising a variable-volume fluid-filled first container which is contractible and expansible so that the fluid therein is maintained at a relatively low first pressure; a fluid-filled second container wherein the fluid is maintained at a relatively high second pressure; conduit means connecting said containers with said chamber; valve means provided in said conduit means and actuatable to establish communication between said second container and said chamber so that the fluid flows from said second container into said chamber with attendant drop of pressure below said second pressure until the pressure in said chamber equals the reduced pressure in said second container; and pump means operable in the closed position of said valve means to convey fluid from said first container into said chamber to thereby raise the pressure in said chamber above said second pressure while the volume of said first container decreases so as to maintain the fluid therein at or close to said first pressure.

8. Apparatus as defined in claim 7, further comprising second valve means provided in said conduit means and actuatable to establish communication between said chamber and said first container to thereby reduce the pressure in said chamber to said first pressure with attendant increase of the volume of said first container subsequent to reduction of pressure in said chamber to said second pressure on renewed actuation of said first mentioned valve means to connect said chamber with said second container.

9. Apparatus as defined in claim 7, further comprising a third fluid-filled container wherein the fluid is maintained at a third pressure lower than said second but higher than said first pressure, said conduit means including a portion connecting said third container with said chamber, and second valve means actuatable to connect said third container with said chamber prior to actuation of said first mentioned valve means so that the pressure in said chamber rises while the pressure in said third container decreases below said third pressure but remains above said first pressure until the pressure in said chamber matches the reduced pressure of fluid in said third container.

10. Apparatus as defined in claim 9, further comprising third valve means provided in said conduit means and actuatable to establish communication between said chamber and said first container subsequent to renewed actuation of said first mentioned and second valve means to thus reduce the pressure in said chamber to said first pressure with attendent increase of the volume of said first container.

11. Apparatus as defined in claim 10, further comprising means for actuating said valves and for operating said pump means in a predetermined sequence.

12. Apparatus as defined in claim 7, wherein the volume of said second container at least equals the volume of said chamber.

13. Apparatus as defined in claim 7, further comprising a check valve provided in said conduit means intermediate said pump means and said chamber to prevent the fluid from flowing from said chamber to said pump means.

* * * * *